United States Patent
Ll

(10) Patent No.: US 8,200,978 B2
(45) Date of Patent: Jun. 12, 2012

(54) SECURITY DEVICE AND METHOD INCORPORATING MULTIPLE VARYING PASSWORD GENERATOR

(75) Inventor: Gong Ling Ll, Dover Crescent (SG)

(73) Assignee: Gong Ling Li, Singapore (SG)

( * ) Notice: Subject to any disclaimer, the term of this patent is extended or adjusted under 35 U.S.C. 154(b) by 899 days.

(21) Appl. No.: 11/773,981

(22) Filed: Jul. 6, 2007

(65) Prior Publication Data

US 2009/0013390 A1    Jan. 8, 2009

(51) Int. Cl.
*H04L 29/06* (2006.01)

(52) U.S. Cl. ........ 713/184; 713/172; 713/182; 713/185; 726/2; 726/5; 726/19; 726/28; 705/72; 705/76; 380/44

(58) Field of Classification Search .................. 713/184, 713/182, 172, 185; 726/2, 5, 19, 28; 705/72, 705/76; 380/44
See application file for complete search history.

(56) References Cited

U.S. PATENT DOCUMENTS

| | | | | |
|---|---|---|---|---|
| 5,261,000 A * | 11/1993 | Hamamoto | ............... | 713/184 |
| 5,280,527 A * | 1/1994 | Gullman et al. | ............... | 713/184 |
| 5,367,572 A * | 11/1994 | Weiss | ............... | 713/184 |
| 5,850,448 A * | 12/1998 | Ganesan | ............... | 713/184 |
| 6,105,133 A * | 8/2000 | Fielder et al. | ............... | 713/169 |
| 7,051,929 B2 * | 5/2006 | Li | ............... | 235/380 |
| 7,278,024 B2 * | 10/2007 | Sundararajan et al. | ........ | 713/183 |
| 7,748,031 B2 * | 6/2010 | Gonzalez et al. | ............... | 726/9 |
| 7,831,837 B1 * | 11/2010 | Duane et al. | ............... | 713/185 |
| 2001/0010081 A1 * | 7/2001 | Nagahama | ............... | 713/202 |
| 2006/0064588 A1 * | 3/2006 | Tidwell et al. | ............... | 713/169 |
| 2006/0230284 A1 * | 10/2006 | Fiske | ............... | 713/184 |
| 2007/0011724 A1 * | 1/2007 | Gonzalez et al. | ............... | 726/4 |
| 2007/0130474 A1 * | 6/2007 | Shatford | ............... | 713/184 |
| 2008/0034216 A1 * | 2/2008 | Law | ............... | 713/183 |
| 2008/0072058 A1 * | 3/2008 | Cedar et al. | ............... | 713/184 |
| 2008/0168544 A1 * | 7/2008 | von Krogh | ............... | 726/6 |
| 2009/0274303 A1 * | 11/2009 | Popp | ............... | 380/273 |
| 2009/0328165 A1 * | 12/2009 | Cook et al. | ............... | 726/6 |
| 2010/0031051 A1 * | 2/2010 | Machani et al. | ............... | 713/181 |
| 2011/0258657 A1 * | 10/2011 | Casilao et al. | ............... | 725/31 |

* cited by examiner

*Primary Examiner* — Syed A. Zia
*Assistant Examiner* — Sarah Su
(74) *Attorney, Agent, or Firm* — Pyrus Pte Ltd

(57) ABSTRACT

A two-varying-password generator having two varying passwords of different digit lengths and different time intervals is disclosed. A two-varying-password generator has a printed circuit board where a processor is soldered onto, a battery, a display window and an on/off key and code key. The processor is loaded with two predetermined programs that can produce two passwords (or more than two passwords) of different digit length and different time interval. Meanwhile, the host computer also stores these two programs in the customer's account. As the clocks of both two-varying-password generator and host computer work in synchronously, both of them can produce two identical passwords of the same moment. Application of two-varying-password generator can counter phishing sites, fight credit card forgery and unauthorized transaction, tackle cloned ATM card.

7 Claims, 3 Drawing Sheets

SECURITY DEVICE AND METHOD INCORPORATING MULTIPLE VARYING PASSWORD GENERATOR

FIELD OF THE INVENTION

This invention relates generally to a method and device for using a varying-password generator; more particularly, a two-varying-password generator that produces two passwords of different digit lengths and different time intervals according to two time-based functions respectively. The two varying passwords can be used as a security measure for Internet banking, credit card payment, ATM card transaction, or any other internet authentication.

BACKGROUND OF THE INVENTION

In modern society, increasing number of people use Internet banking, Internet shopping, and engage in e-commerce activities. In doing so, they have to login with a user ID and password. However, these fixed user ID and password can be easily stolen by criminals using spyware, hacking techniques, phishing website, etc. Also, criminals reveal that protective measures such as card number and card holder's name of a credit card or fixed password are not enough. Criminals may gain access to the information and use these fixed information to access customer's online account illegally, to forge a credit card or clone an ATM card.

To solve problems associated with a fixed password, some banks have issued password generators to their customers who have Internet banking accounts. The most popular password generator, known as SecurID token, is developed by RSA Security Inc. The working principle of SecurID token as follows: A SecurID token generates a pseudo random number as a varying password every 30 (or 60) seconds according to a program. The host computer also generates same varying password every 30 seconds with the same program at same time in the customer's account. When the customer logs-in for Internet banking, he/she submits the password shown on SecurID token. If the password submitted by the customer is identical to the one generated by host computer, the customer is admitted to his/her account. Varying-password generators provide high security for internet banking, as it is impossible to predict the password without the program. Even if a varying password is stolen, it is useless as the varying password is valid for only a few minutes after it is generated and it can only be used once.

However, there are security deficiencies and other disadvantages for a normal password generator, such as SecurID token. Firstly, it is unable to tackle phishing. It only allows bank to verify the customer, but customers are unable to verify if the website they login is fake. There exists a risk for customers and banks if criminals stole customer login information and varying password using a phishing website and instantly use them to login to the bank's website and access the customer's account.

Secondly, banks issue SecurID token only for online transactions (Internet banking) but not to tackle credit card forgery or ATM card cloning.

Thirdly, the size of SecurID token is not small enough hence it is inconvenient for customers to carry more than two SecurID tokens. However, people normally have more than two accounts at different banks.

U.S. Pat. No. 7,051,929 B2 proposes a secure credit card having a daily changing security number. The secure credit card contains a processor, key or keypad, battery, display window and a program download port. The processor is loaded with a predetermined program so that the processor can generate date and a daily renewed security number that can be shown on the display window. The security number is the function of the date and their relationship is defined by the predetermined program. The computer of the credit card company keeps this predetermined program and can compute the security number of the date using this predetermined program. The security number of the date computed by the credit card company is identical to the security number of the date shown on the display window of the secure credit card. So that the validity of the credit card and its transaction can be verified by the credit card company based on the cardholder's name, card number and the security number of the date.

Although this secure credit card can prevent credit card from being forged, it still has a safety deficiency. For example, the criminals can use fake websites (phishing sites) or trojans to steal the information and security number of a secure credit card and use them to make illegal payment instantly.

It is our objective to provide a two-varying-password generator. Unlike a normal varying-password generator which produces only one varying password at a certain time interval, the two-varying-password generator produces two varying passwords of different digit lengths and different time intervals according to two algorithms or programs respectively. Therefore, even if the password were intercepted by criminals, they can't use this password as it expires after a few minutes or had already been used. Furthermore, it not only allows bank to authenticate customers, but also allows customers to verify whether the bank website which they are accessing is fake or not. The two-varying-password generator also can be applied to tackle credit card forgery and ATM card cloning. Also, host computer is added with very low computation load by each customer. This means that annual fee for each customer is negligible. A two-varying-password generator also has very low computation load since most of the time it is in sleeping mode. It can be made in very slim size as only a button-size battery is enough to support its 5-year life span.

SUMMARY OF THE INVENTION

A two-varying-password generator has a printed circuit board where a processor is soldered onto, a battery, a display window and an on/off key and code key. The processor is loaded with two predetermined programs that can produce two passwords (or more than two passwords) of different digit length and different time interval. Typically, the first password has 3 digits and is updated in an interval of 15 minutes; the second password has 5 digits and is updated in an interval of 30 seconds. When the on/off key is pressed, the processor is activated and produces two passwords at the moment using the two predetermined programs loaded in the processor; two passwords are displayed in the display window. The two passwords are time-based functions defined by two predetermined programs respectively.

Meanwhile, the host computer also stores these two programs in the customer's account. As the clocks of both two-varying-password generator and host computer work in synchrony, both of them produce identical passwords of the same moment.

These two dynamic passwords of different digit lengths and different time interval provide high security for the different types of transactions listed below:

Counter Phishing Sites:

The two-varying-password generator not only allows banks to authenticate their customers, but also allows customers to verify that the website they login is not a phishing site.

When a customer wants to access his bank account from the bank's website, he will have to first enter his username and pin number (fixed password). Then the bank will return him the first password generated by the unique program in the customer's account. Customer will check whether the first password sent by bank matches the first password displayed in his two-varying-password generator. If yes, the customer can be certain that he has not entered a phishing site, and submits the second password from his two-varying generator. Only if the second password sent by customer is identical with the one generated by host computer using the second predetermined program in the customer's account, the bank will allow the customer to access his account.

Application in Tackling Credit Card Forgery:

When making credit card payments at a cashier or online, in addition to the card number and card name, customers must also submit the first password or second password respectively from their two-varying-password generator. Thus, even if the information of credit card and password were stolen, it is still impossible to use the information to forge a credit card or make unauthorized transactions.

Application in Tackling ATM Card Cloning:

When a customer uses an ATM machine to withdraw money or perform other transactions, customer has to first insert the ATM card then enter the second password from his two-varying-password generator instead of a pin number. As the second password changes once every 30 seconds, it is impossible to clone an ATM card even if the information of ATM card were stolen.

A two-varying-password generator having two dynamic passwords posses other two advantages over a normal password generator: very low annual fee and slim size.

In this invention, only when customers switch on the two-varying-password generator will passwords of the current time be generated. In addition, only when a password is sent to the host computer will a password be generated using the respective function in the customer's account. When the two-varying-password generator is not in use, it will not generate passwords, nor will the host computer. This means minimal investment in need in the upgrading or maintenance of the host computer and the annual fee for customers is negligible.

As most of the time a two-varying-password generator is in sleep-mode, consuming very little energy. Therefore, a two-varying-password generator only requires a button-sized battery and the body size of the two-varying-password generator can be very slim.

The objectives and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

Figure 1:
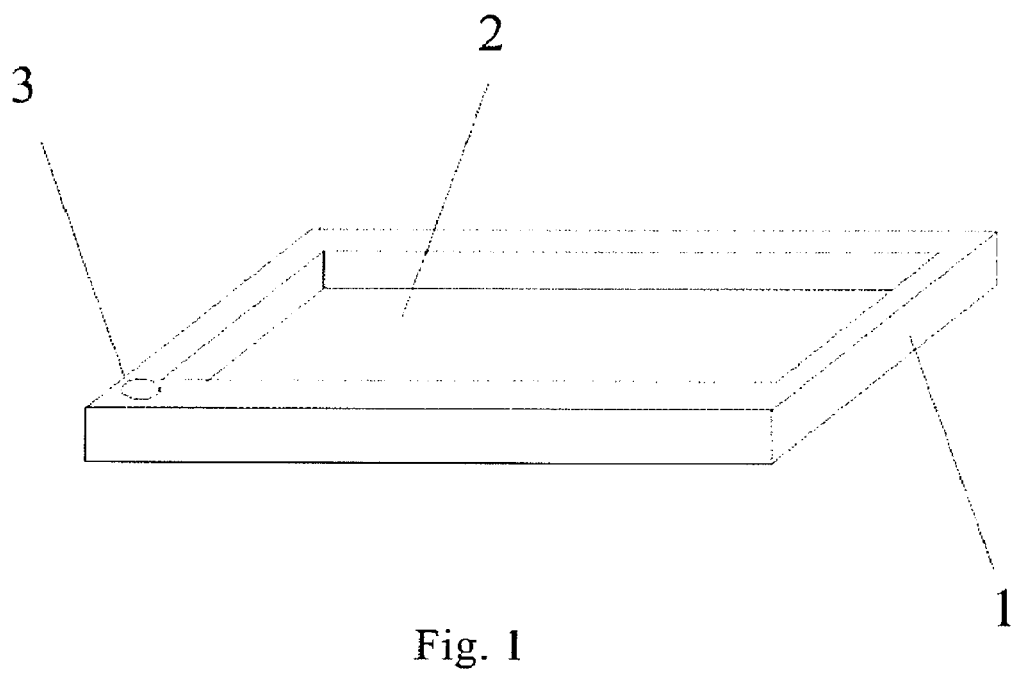
FIG. 1 is an isometric figure of the body of a two-varying-password generator.
Figure 2:
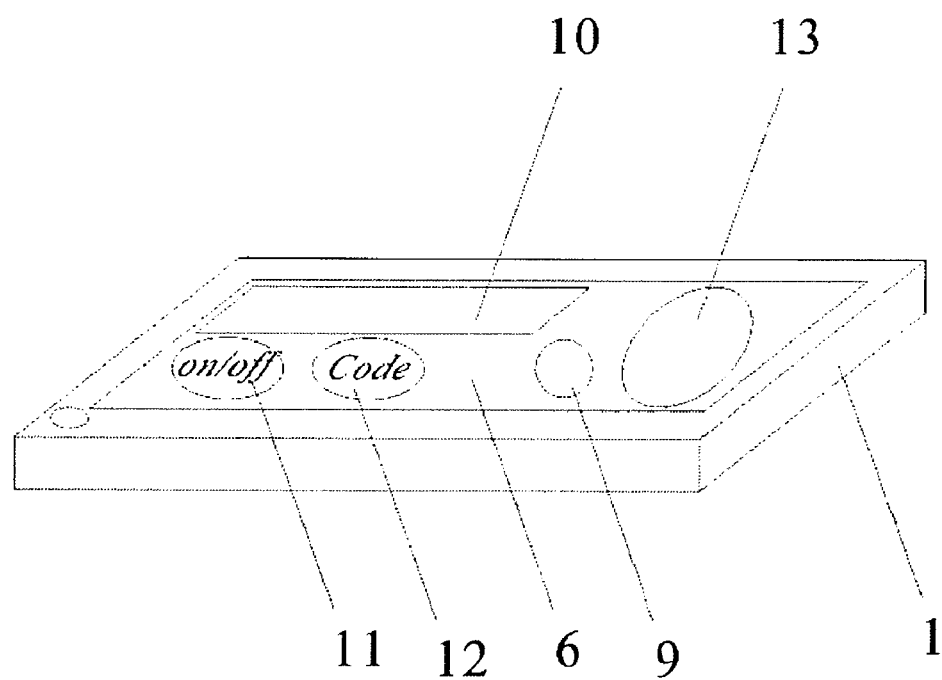
FIG. 2 is an isometric figure of a two-varying-password generator with PCB (printed circuit board), display window and battery inside the cavity.
Figure 3:
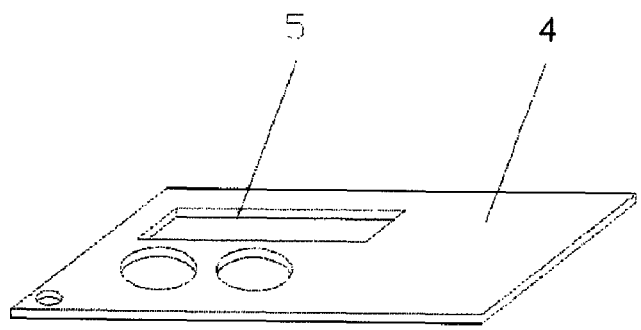
FIG. 3 is an isometric figure of the cover of a two-varying-password generator.
Figure 4:
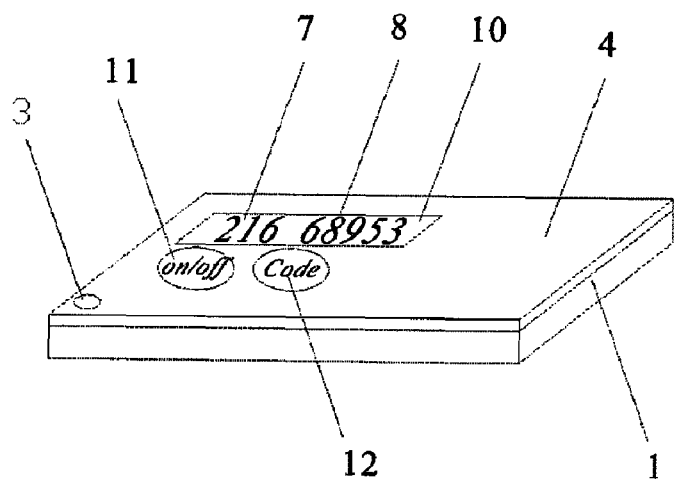
FIG. 4 is an isometric figure of a two-varying-password generator, where passwords are displayed as numeral number.

FIG. 1 is an isometric drawing of body 1 of a two-varying-password generator. There is a shallow cavity 2 and through hole 3 in body 1, a printed circuit board 6, a power source 13, a display window 10 and controller is placed inside the cavity 2 as shown in FIG. 2. There is a processor 9 soldered onto the circuit board 6. In this embodiment, the power source 13 is a battery which provides power for processor 9, display window 10 and printed circuit board 6. A display window 10 is a LCD (Liquid Crystal Display window, the controller is a keypad which has on/off key 11 and code key 12. The on/off key 11 controls the on or off status of the processor 9 and display window 10. Code key 12 controls what the display window 10 is displaying. A display window 10 and an on/off key 11 and code key 12 are placed on one surface body 1. FIG. 3 shows an isometric drawing of cover 4 which is used to seal the cavity 2. There are openings 5 in cover 4, the positions of these openings 5 match with the positions of display window 10, on/off key 11 and code key 12. FIG. 4 shows a complete two-varying-password generator, with cover 4 placed on top of cavity 2. The display window 10 can be seen and on/off key 11 and code key 12 can be presented through those openings 5 in cover 4.

Figure 5:
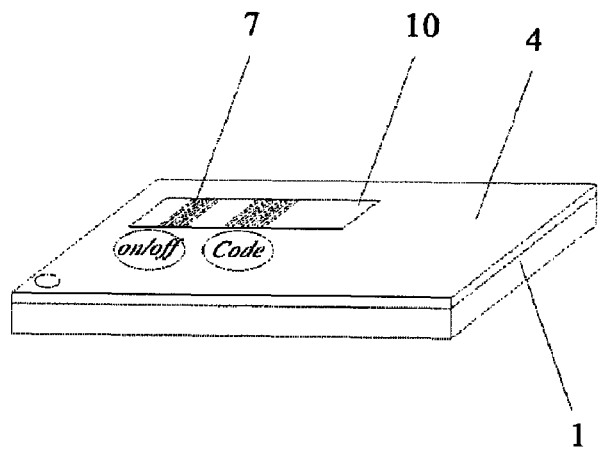
FIG. 5 is an isometric figure of a two-varying-password generator, where passwords are displayed as barcode.

The processor 9 is loaded with at least two predetermined programs that can produce at least two passwords of different digit length and different time interval. The shorter password named as first password 7 and the longer one named as second password 8 as shown in FIG. 4. The first password 7 has 2 to 5 digits, and is updated in an interval of a few minutes to a few hours; the second password 8 has 4 to 8 digits, and is updated in an interval of a few seconds to a few minutes. Passwords consist of numerals and letters. In this embodiment, first password 7 has 3 digits, and is updated every 15 minutes; second password has 5 digits, and is updated every 30 seconds. When the on/off key 11 is pressed, the processor 9 is activated and produces two passwords of the current time using the two predetermined programs respectively. Two passwords are displayed in the display window 10 at same time in this embodiment as FIG. 4 shows. However, two passwords can also be displayed in the display window 10 alternatively by pressing on code key 12. Display disappears after a predetermined time period (preferably 2 minutes) and the processor 9 reverts to sleeping mood. First password 7 also can be displayed in the form of barcode as FIG. 5 shows. In this embodiment, when code key 12 is pressed, first password 7 will be displayed in display window 10 as a number, or as a barcode when code key 12 is pressed again.

The two passwords are the functions of time defined by two predetermined programs. First password 7 is a function of the year, month, day, hour and minute.

$$\text{First password}=f1(\text{year,month,date,hour,minute}) \quad \text{equation 1}$$

Second password 8 is a function of the year, month, date, hour, minute and second:

Second password=$f2$(year,month,date,hour,minute, second)     equation 2

An example of the program to generate first password is given as:

First password is generated by the program:

$$A = c1 \times YY + c2 \times MM \times MM + c3 \times YY \times hh \times mm \quad \text{equation 3}$$

In equation 3, YY stands for year, MM is month, DD is date, hh is hour, mm is minute and ss is second, c is coefficient. Here $c1=3$, $c2=4$, $c3=6$ The first password is the last 3 digit of A.

If the current time is: May 18, 2007, 16 hour 35 minute, then the YY=7, MM=5, DD=18, hh=16, and mm=35, so the equation 3 has the result:

A=23641

As the first password takes last 3 digit of A, thus first password is 641.

There are thousands of different programs and thousands of combination of coefficients for generation of passwords, as well as the password is only part of the computation result (in above example, 641 is part of 23641). Therefore, even if the passwords were stolen, criminals can not use the stolen passwords to figure out the program.

Meanwhile, the host computer also stores these two programs in the customer's account. As the clocks of both two-varying-password generator and host computer work in synchrony, both of them produce identical passwords of the same moment.

These two dynamic passwords of different digit lengths and different time interval provide high security for the different types of transactions listed below:

Application in Online Transactions (Internet Banking):

Normally, when a customer wants to access his bank account, he or she is requested to submit password for verification, but the customer cannot verify whether the website which he or she is logging in is fake or not. Thus, customers may enter phishing sites (fake bank's website to steal customers' account information and passwords) unknowingly. However, the two-varying-password generator having two dynamic passwords can effectively counter phishing sites, as it not only allows banks to authenticate their customers, but also allows customers to verify the websites of the bank.

When a customer wants to access his bank account from the bank's website, he will have to first enter his username and pin number (fixed password). Host computer will contact the first predetermined program in the account of the customer and generate a first password 7. This first password 7 will be forwarded to customer. Once the customer receives the first password in his terminal, he will compare this first password with the one displayed in his two-varying-password generator. If both first passwords match each other, the customer can be certain that he has not entered a phishing site (fake bank's website to steal customers' account information and passwords). Then he submits the second password generated by his two-varying-password generator. If the second password 8 sent by customer is identical with the one generated by host computer using the second predetermined program in the customer's account, bank will allow the customer to access his account.

As some customers will require a slightly longer length of time to compare the first password sent by bank with the one displayed in his varying-password generator, if the first password also is updated in every 30 seconds, some customers may encounter the problem that the first password had changed before they complete the checking. Hence, the first password preferrably have a longer life span. The second password does not have such problem as it is designed for host computer to authenticate. Thus the life span for second password is selected shorter for higher security.

Application in Tackling Credit Card Forgery:

Making Credit Card Payments at a Cashier:

The usual way to make payment by credit card is as follows: customer submit his credit card to cashier; cashier will swipe the credit card then enter the sum of money. The information of credit card (card name and card number) and sum of money will be sent to the bank for authentication. Similarly, the way to make payment by credit card with an additional security measure by using a two-varying-password generator is as follows: customer submits his credit card and two-varying-password generator to cashier. Cashier first swipes the credit card, then enters the sum of money, and also enters the first password from the two-varying-password generator as a suffix or prefix of the sum of the money. The information of credit card and sum of money together with the first password will be sent to bank for authentication. Therefore, no additional device is required for the application of two-varying-password generator in tackling credit card forgery.

To shorten the time for entering the first password, and ensure the first password is not updated when in use, first password is preferably shorter and has longer life span. As the 3-digit first password 7 only requires a few seconds for cashier to enter, it would not be significantly more troublesome for both cashier and customers. In addition, the first password 7 can be displayed as a barcode, which can be scanned using a scanner quickly (mostly, the sum of money of the purchased items is entered by a scanner). As the first password 7 changes once every 15 minutes in this embodiment, even if the first password were stolen, it is still impossible, within the period of 15 minutes, to forge a credit card and use it with the stolen password to make payment at a cashier.

Making Credit Card Payments Online:

When making credit card payments online, there exists the danger that the credit card information may be stolen by Trojans or spyware and used to make unauthorized transactions instantly. Using two-varying-password generator will eliminate such a risk. When making credit card payments online, in addition to their credit card number and card name, customer also must enter the bill with the second password 8 from the two-varying-password generator. When the host computer receives the bill, the host computer will execute the unique function in the customer's account and generate a second password 8. These two passwords will be compared. Only if they are the same will the transaction be approved.

If the second password and the information of credit card are stolen, criminals may use them to make unauthorized transaction instantly. However, when criminal submits the stolen password to the bank for authorization, the bank will know the stolen password that has been used earlier, thus the bank will reject this transaction.

As the customer is purchasing online behind a computer terminal, it is not very troublesome to enter the longer second password 8.

Application in Tackling ATM Card Cloning:

When customers use an ATM machine to withdraw money or perform other transactions, the customer has to first insert the ATM card then enter the second password 8 instead of a pin number. After the ATM machine reads the customer's information from the ATM card, both the customer's information and the second password 8 will be sent to the host computer. The host computer will execute the unique function under the customer's account and generate a second password 8. These two passwords will be compared. Only if the passwords are the same will customers be allowed to access their accounts.

When customers are using ATM cards with the two-varying-password generator, the usage is actually similar to using a normal ATM card and will unlikely burden customers. Existing ATM machines of banks also need not be modified and therefore will not require additional investments. However, security is vastly improved. As the second password 8 changes once every 30 seconds, it cannot be used to clone an ATM card even if it were stolen.

Two-varying-password generator possesses other two advantages over a normal password generator: very low annual fee and slim size that allows customer to carry up to 6 pieces of the two-varying-password generator.

Annual Fee:

For a normal password generator, the annual fee for each password generator is significant and it is the reason why banks issue normal password generator only to internet banking customers, not every customer.

A normal password generator, such as RSA's SecurID token from RSA Security Inc, uses pseudo random numbers as varying passwords. As a pseudo random number is generated based on the previous pseudo random number, the password generator must constantly generate a pseudo random password every 30 seconds. Similarly, the host computer must also constantly generate a pseudo random number (varying password) every 30 seconds for each customer. Even if the customer isn't using the password generator, the host computer must also generate a password for a customer 2880 times daily, 1,036,800 times annually. As a result, for every password generator distributed to customers, host computer must perform over 1 million password generations annually for each customer. This requires a considerable investment in the upgrading and maintenance of the mainframe and this cost will attribute as annual fee for each password generator.

The reason why banks issue password generators only to internet banking customers, and not to every customer who holds a credit card or an ATM card, is that, as online transactions are self-service, banks can save on manpower costs and therefore banks can adsorb the annual costs for customers who use online transactions (internet banking). However, if credit card and ATM card users used password generator, banks would not save on manpower costs and will not be willing to adsorb annual costs for these customers.

However, this invention's passwords are only the functions of time defined by their respective predetermined programs. Password generation only occurs when the two-varying-password generator is used. When not in use, no password is generated by both two-varying-password generator and host computer. On the average, a customer will only use two-varying-password generator only once per day. This means the host computer will only execute the function under the customer's account on the average of once a day, 365 times a year. Therefore, even if the bank distributed two-varying-password generator to every customer, the host computer only needs to perform an average of 365 calculations a year per customer. This means minimal investment in need in the upgrading or maintenance of the host computer and the annual fee for customers is so little that it can be neglected.

Slim Size:

As normal password generators must constantly generate a pseudo random number as a password every 30 seconds, it consumes energy 24 hours a day. This has lead to the need for a battery with large capacity, resulting in the large body size. Typically, a normal password generator has the size of 20×35×60 mm. With such size, a normal password generator can not be kept in a wallet. It can only be hooked onto key chains. However, a working person normally has 2 or more credit cards or ATM cards of different banks, a key chain to hook 2 or more such normal varying-password generator will become very clumsy.

In this invention, two passwords are the functions of time. Password generation only occurs when the two-varying-password generator is used. When not in use, a two-varying-password generator enters a power-saving sleep-mode. On the average, a customer will only use the two-varying-password generator only once per day, 365 times a year. This means that most of the time a two-varying-password generator is in sleep-mode, consuming very little energy. Therefore, the two-varying-password generator having a 5-year service only requires a button-sized battery and the body size of a two-varying-password generator can be very slim.

Figure 6:
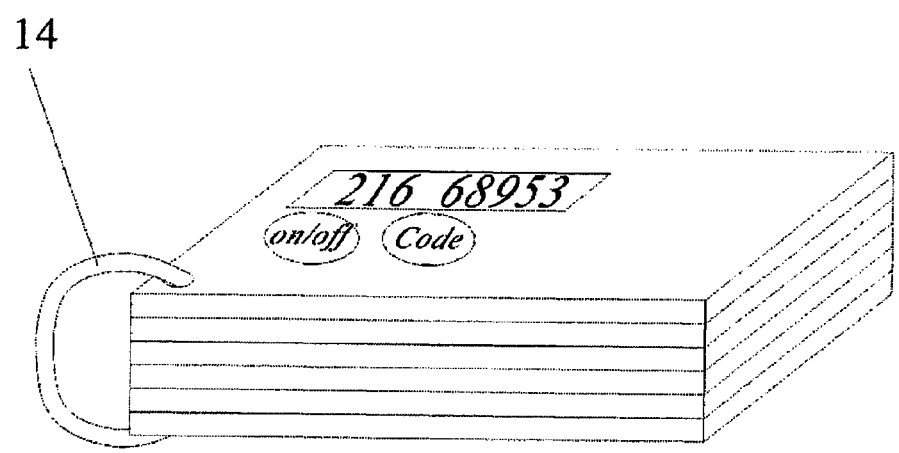
FIG. 6 shows that up to 6 of two-varying-password generators are stringed together.
Figure 7:
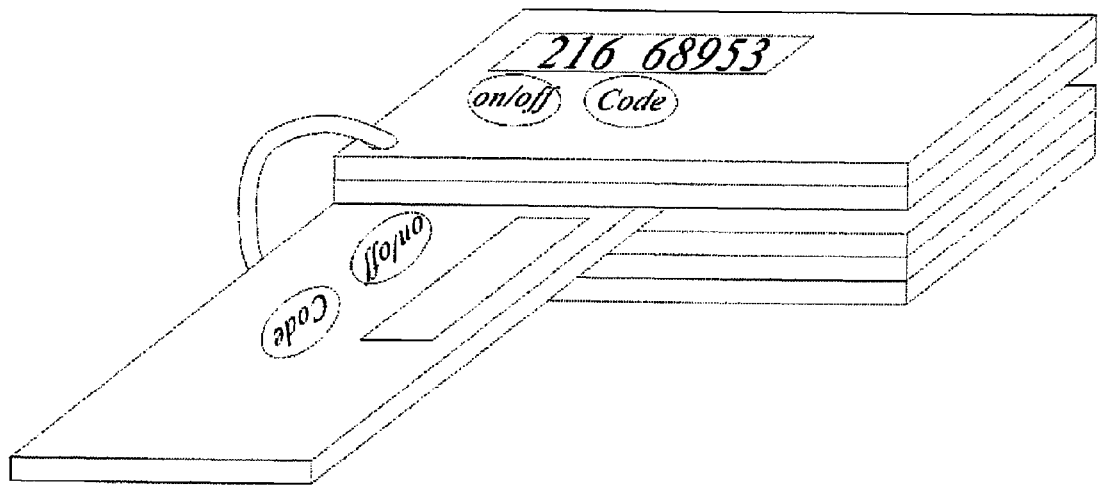
FIG. 7 shows that one of the two-varying-password generators is rotated out for use.

In this embodiment, the dimension of a two-varying-password generator is: 4×35×60 mm with a button battery that can last up to 5 years. Up to 4 pieces of such generators can be kept in a wallet. Up to 6 pieces of such generators can be stringed together using a pin 14 going through hole 3, as FIG. 6 shows. 6 pieces of such generators stringed together has the size of 24×35×65 mm, similar to the size of one normal password generator, and can be hooked onto key chains. When one of the two-varying-password generators is in used, it can be rotated out as FIG. 7 shows.

A two-varying-password generator also can be loaded with many pair of different predetermined programs during manufacturing process. So every bank or other organizations can use one pair of these predetermined programs and share one two-varying-password generator. Furthermore, a two-varying-password generator can have a data import port, banks or other organizations can load in their programs for the generation of varying passwords.

A mobile phone is also a device that may accommodate a printed circuit board, a battery, display window and key pad, similar to a two-varying-password generator. So, a new varying-password generator can be integrated into a mobile phone. Banks can input their two predetermined programs into the processor of a mobile phone to generate their first and second passwords respectively. The advantages of a two-varying-password generator integrated into a mobile phone is that customer does not need to carry many pieces of varying-password generators of different banks; the disadvantages are that the predetermined programs for generation of the two passwords loaded in the processor of a mobile phone could be stolen by hackers, Trojans, spyware, etc as a mobile phone is connected to the Internet. It poses no risk if varying passwords were intercepted, as discussed before, but it will result in greater loss if the two predetermined programs were stolen.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

What is claimed is:

1. A two-varying-password generator comprising:
a body;
a printed circuit board with a processor embedded within the body;
a display window located on one surface of the body;

a controller located on one surface of the body for controlling a status of the processor and the display window; and a power source disposed within the body to provide power for the processor, display window and printed circuit board;

wherein the processor is embedded with at least a first predetermined algorithm and a second predetermined algorithm, the first predetermined algorithm generating a first password at a first time interval and the second predetermined algorithm generating a second password at a second time interval, wherein the first predetermined algorithm and the second predetermined algorithm are different, and wherein the first and second passwords are functions of time;

wherein the first password generated by said first predetermined algorithm consists of 2 to 5 digits and the second password generated by said second predetermined algorithm consists of 4 to 8 digits; and wherein the first password is changed to a new one at the first time interval of a few minutes to a few hours; and the second password is changed to a new one at the second time interval of a few seconds to a few minutes;

wherein the first password and the second password are displayed in said display window at the same time or alternatively when said processor is activated;

wherein a host computer at a service provider for authorizing the transactions of internet banking, credit card, or an ATM card contains said first and second predetermined algorithms in an account of a customer owning the two-varying-password generator; thereby at any given time, the host computer can compute a third password and a fourth password that are identical to the first and second passwords, respectively, generated by the first and second predetermined algorithms embedded in the processor of the two-varying-password generator; so that, when the customer accesses the account from a terminal (computer terminal) via network, the host computer uses the contained first and second predetermined algorithms to generate the third and the fourth passwords: the third password is sent to the terminal of the customer so that the customer can compare the password received from the host computer with the corresponding first password showing on the display window of the two-varying password generator, thus allowing the customer to authenticate the host computer; and the second password is input by the customer into the terminal and sent to the host computer so that the host computer can compare the password received from the terminal with the corresponding fourth password generated by itself; thus allowing the host computer to authenticate the customer.

2. The two-varying-password generator according to claim 1, wherein said first password is the function of year, month, date, hour and minute, this function is defined by said first predetermined algorithm; said second password is the function of year, month, date, hour, minute and second, this function is defined by said second predetermined algorithm.

3. The two-varying-password generator according to claim 1, wherein said body has a cavity and a cover, said cover is used to cover said cavity.

4. The two-varying-password generator according to claim 1, wherein said power source is a battery.

5. The two-varying-password generator according to claim 1, wherein said controller is a keypad.

6. The two-varying-password generator according to claim 1, wherein said display window is a LCD (Liquid Crystal Display) window.

7. The two-varying-password generator according to claim 1, wherein said body takes a mobile-phone-like shape.

* * * * *